US009946045B2

(12) United States Patent
Kegerise et al.

(10) Patent No.: US 9,946,045 B2
(45) Date of Patent: Apr. 17, 2018

(54) HIGH DENSITY SPLITTER AGGREGATION MODULE

(71) Applicants: COMMSCOPE TECHNOLOGIES LLC, Hickory, NC (US); COMMSCOPE CONNECTIVITY BELGIUM BVBA, Kessel-Lo (BE)

(72) Inventors: Craig Bryan Kegerise, Middletown, PA (US); Sean Patrick Kelly, York, PA (US); Didier Pierre W. Claeys, Shaffen (BE)

(73) Assignees: CommScope Technologies LLC, Hickory, NC (US); CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 14/770,052

(22) PCT Filed: Feb. 26, 2014

(86) PCT No.: PCT/US2014/018646
§ 371 (c)(1),
(2) Date: Aug. 24, 2015

(87) PCT Pub. No.: WO2014/134154
PCT Pub. Date: Sep. 4, 2014

(65) Prior Publication Data
US 2016/0004026 A1 Jan. 7, 2016

Related U.S. Application Data

(60) Provisional application No. 61/769,552, filed on Feb. 26, 2013, provisional application No. 61/771,535, filed on Mar. 1, 2013.

(51) Int. Cl.
*G02B 6/44* (2006.01)

(52) U.S. Cl.
CPC ......... *G02B 6/4471* (2013.01); *G02B 6/4452* (2013.01); *G02B 6/4457* (2013.01)

(58) Field of Classification Search
CPC .. G02B 6/4471; G02B 6/4452; G02B 6/4457; G02B 2006/1215
See application file for complete search history.

(56) References Cited

U.S. PATENT DOCUMENTS 7,983,560 B2 * 7/2011 Maki .................. H04J 14/0204
398/48
8,249,450 B2 * 8/2012 Conner ................ G02B 6/4453
398/141

(Continued)

FOREIGN PATENT DOCUMENTS

JP 4832766 12/2011

OTHER PUBLICATIONS

International Search Report for International Application No. PCT/US2014/018646 dated May 26, 2014 (3 pages).

(Continued)

*Primary Examiner* — John M Bedtelyon
(74) *Attorney, Agent, or Firm* — Merchant & Gould P.C.

(57) ABSTRACT

A module includes a plurality of splitters, a plurality of inputs, and a plurality of outputs wherein the outputs are connected to multi-fiber connectors and wherein outputs from a plurality of splitters are connected to one of the multi-fiber connectors. The splitters have outputs in multiples of eight, such as a 1×32 splitter. The multi-fiber connectors include twelve fiber cables.

12 Claims, 6 Drawing Sheets

(56) References Cited

U.S. PATENT DOCUMENTS

| | | |
|---|---|---|
| 2003/0016925 A1* | 1/2003 | Sun .................. G02B 6/3612 385/115 |
| 2005/0169567 A1 | 8/2005 | Bernasconi et al. |
| 2006/0008231 A1* | 1/2006 | Reagan .............. G02B 6/3849 385/135 |
| 2006/0165366 A1 | 7/2006 | Feustel et al. |
| 2006/0233507 A1* | 10/2006 | Makrides-Saravanos ............... G02B 6/4453 385/135 |
| 2006/0285807 A1* | 12/2006 | Lu ..................... G02B 6/3825 385/92 |
| 2007/0165995 A1* | 7/2007 | Reagan .............. G02B 6/4452 385/135 |
| 2008/0152292 A1 | 6/2008 | Wilken et al. |
| 2009/0087140 A1 | 4/2009 | Castonguay et al. |
| 2009/0202206 A1 | 8/2009 | Henschel et al. |
| 2010/0111483 A1 | 5/2010 | Reinhardt et al. |
| 2011/0293235 A1 | 12/2011 | Nieves et al. |
| 2013/0308915 A1* | 11/2013 | Buff .................. G02B 6/4452 385/135 |
| 2014/0314385 A1* | 10/2014 | Miller ............... G02B 6/4452 385/135 |
| 2015/0162982 A1* | 6/2015 | Buff .................. H04B 10/25 398/142 |

OTHER PUBLICATIONS

International Written Opinion for International Application No. PCT/US2014/018646 dated May 26, 2014 (14 pages).
European Search Report for Application No. 14756418.1 dated Sep. 20, 2016.

\* cited by examiner

HIGH DENSITY SPLITTER AGGREGATION MODULE

CROSS-REFERENCE TO RELATED APPLICATION(S)

This application is a National Stage of PCT International Patent application No. PCT/US2014/018646, filed 26 Feb. 2014 which claims benefit of U.S. Patent Application Ser. No. 61/769,552 filed on 26 Feb. 2013, and U.S. Patent Application Ser. No. 61/771,535 filed on 1 Mar. 2013, the disclosures of which are incorporated herein by reference in their entireties. To the extent appropriate, a claim of priority is made to each of the above disclosed applications.

BACKGROUND

The present invention relates to fiber optic splitters and utilizing splitter outputs within modules, panels, racks, enclosures, or other structures.

Splitters typically have one or more inputs, and create a greater number of outputs. Splitters can be in the form of optical splitters and/or multiplexing splitters. Usually, the splitters are incorporated into a larger system where the splitter outputs are connected to panels or other equipment in the system.

Further improvements in this area are desired.

SUMMARY

The present invention concerns structures and systems which include fiber optic splitters and input connector locations and output connector locations that result in reduced cabling and reduced space requirements.

In one embodiment, a splitter aggregation module includes a housing, a plurality of input connector locations, and a plurality of splitters. Each splitter includes at least one input, with each input connected to one of the input connector locations. The splitters each have a plurality of outputs. Output connector locations of the module are in the form of a plurality of multi-fiber connectors connected to the outputs of the splitters. At least one of the multi-fiber connectors has outputs from more than one of the plurality of the splitters.

In the preferred embodiment, the splitters each have outputs which are in multiples of eight. The multi-fiber connectors of the preferred embodiment include fiber pathways in multiples of twelve.

In one embodiment, the splitters are each 1×32 splitters. In a preferred embodiment, three splitters of the 1×32 type are provided which result in 96 fiber outputs which can be grouped into eight multi-fiber connector fiber outputs from the module.

Other splitter arrangements can be provided, such as 2×32 splitters, instead of one or more of the 1×32 splitters Other arrangements of the splitters including more than one input per splitter, and different numbers of multi-fiber connector inputs and outputs are possible.

DETAILED DESCRIPTION

Current splitter packaging configurations reflect individual split ratios of the splitter itself. For example, a 1×32 (1 by 32) splitter will be packaged in a way where there is a single input and 32 individual output legs. Some arrangements include each output leg being connectorized, each connecting to a coupling adapter in a package or enclosure that is sized to accommodate the number of adapters. Splitters can also include other split ratios, and multiple inputs.

With the current splitter packaging options, typically the splitters include individual outputs. With the individual outputs, increased amounts of space are taken up as fiber counts increase.

There is a need to reduce the spacing requirements of a fiber optic system as fiber counts increase. Also, there is a need to combine individual splitter outputs from individual cables to multi-fiber cables and connectors.

It is known in the splitter environment that splitter ratios are typically 1 by 2, 1 by 4, 1 by 8, and further in multiples of 8. With respect to multi-fiber cables and connectors, it is known that the fiber counts are in multiples of 12. One aspect of the present invention is to utilize splitter outputs in multiples of 8 and combine them with multi-fiber connectors and cables utilizing all 12 of the fibers in an organized manner for the technician or user of the system. Multi-fiber cables and connectors can include more than 12 fibers, such as 24, 36, and additional multiples of 12.

A high density splitter aggregation module in accordance with the invention allows for the transition from the outputs of the splitter and multiples of 8 into output connectors having multiples of 12. Such construction in the aggregation module avoids the use of a cross-connect panel arrangement which can accomplish the transition, but requires additional rack space, cabling and equipment to do so.

Figure 1:
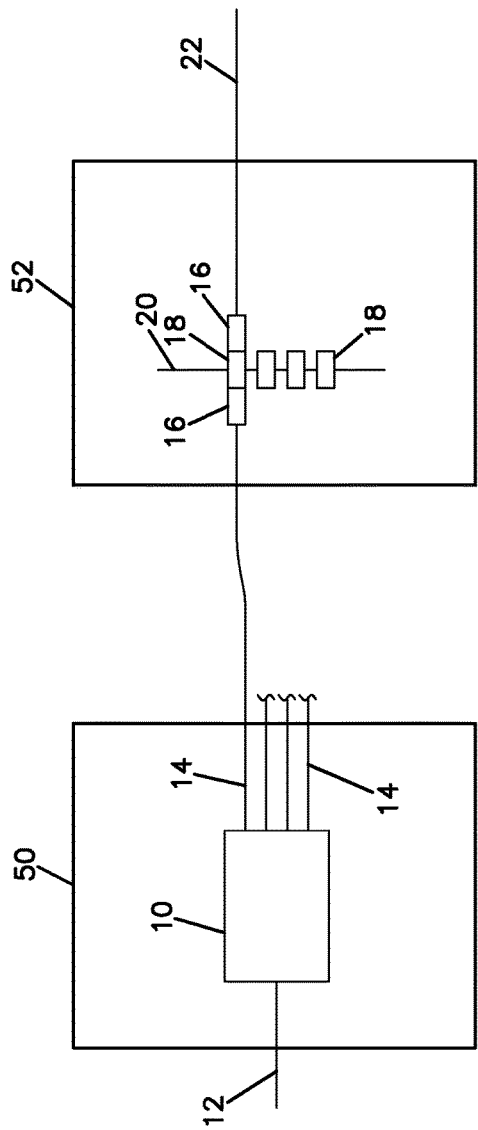
FIG. 1 shows an example splitter arrangement in the prior art where a splitter includes an input, and a plurality of individual outputs in one location which are routed to a patch panel in a second location.
Figure 2:
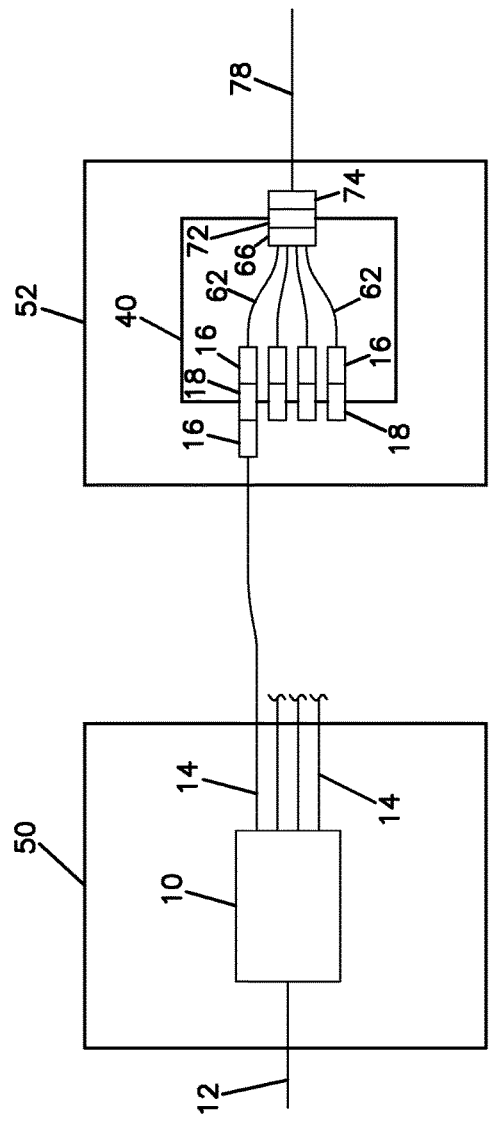
FIG. 2 shows another example of a prior art splitter arrangement in which a splitter is mounted in a first location and has an input, and a plurality of individual outputs, wherein the individual outputs are connected to a module having a plurality of inputs, and one output and, wherein the module is mounted in a location separate from the splitter.

Referring now to FIGS. 1 and 2, prior art splitter arrangements are illustrated. FIG. 1 shows a first splitter 10 with an input 12 and multiple outputs 14. Splitter 10 is mounted in a rack 50. Rack 50 may hold other splitters 10. The outputs 14 are connectorized with connectors 16 which mate with adapters 18 of a patch panel 20. Patch panel 20 is a rack mounted panel, plate or other structure which holds adapters. Patch panel 20 is mounted in a rack 52 which may be in the same rack 50 holding splitter 10, or in a different rack. Extending from adapter 18 is a connectorized output cable 22 having a connector 16 which connects to the other connector 16 of the connectorized output from the splitter 10. The inputs 12 to each splitter 10 can be connectorized cables with connectors 16 that mate with adapters 18 and internal cables within splitter 10. The inputs 12 can be direct connections to each splitter 10 if desired.

FIG. 2 shows a similar splitter arrangement for splitter 10 and rack 50 wherein the connectorized outputs extend to the cassette or module 40 having single adapters 18 on one side of the module 40. Within module 40 are individual connectors 16 and cables 62 which connect to a multi-fiber connector 66. Such a connection can be with an adapter 72 and a second connector 74 in the form of a multi-fiber connector and a multi-fiber cable 78.

In the systems of FIGS. 1 and 2, a significant amount of space is needed for the individual splitter output cables. Cables 12, 14 are single fiber cables. Connectors 16 are single fiber connectors such as SC or LC. Further, additional space is needed for the separate mounting of the splitters 10 and the patch panels 20 or the modules 40. Signal losses are increased due to the extra connections between input cable 12 and output cables 22, 78 from the intermediate connectors and adapters.

In addition, splitters 10 typically are in multiples of two or four, and more specifically in multiples of eight with regard to splitter outputs. Similarly, the individual cables are cumbersome to handle for connecting to further equipment from the patch panel 20. In the case of a multi-fiber cable, the multi-fiber cable is typically constructed with a multiple of twelve fibers. Therefore, a technician may have unused fibers, or have difficulty keeping track of which fibers relate to which splitter.

The aggregation module of the present invention houses multiple splitters in a housing construction that reduces the required footprint for multiple splitters in a panel, rack, enclosure, or room. The outputs of the package are comprised of multiple, multi-fiber connectors, such as MPO/MTP connectors. Those multi-fiber connections are directly terminated to the multiple outputs of the multiple splitters in an organized and consistent manner which eliminates the additional cabling, cassette, rack space, cable management, and administration requirements of a traditional cross-connect like that shown in FIGS. 1 and 2. A user or technician can more easily keep track of the splitter outputs with the aggregation module.

The multi-fiber outputs allow direct connection to consolidation points using multi-fiber technology while eliminating one connected mated pair in the link and the associated cross-connect cabling which in turn reduces attenuation and points of failure from contamination.

The present invention solves the issue of the mismatch of output leg counts on splitters (multiples of 8) and fiber counts of multi-fiber connections (multiples of 12) by grouping splitter counts in multiples that have common denominators of both 8 and 12. One example is a 96 fiber high density splitter module. This example consists of three individual 1×32 splitters, each with its own input (1 or 2 fibers) with a total of 96 output fibers. Those 96 fibers are grouped into 8, 12 fiber multi-fiber connectors in a single compact package. The combined output count of 96 is divisible by 8 to match the splitter, but is also divisible by 12 to match the multi-fiber connections.

Other embodiments could include packages containing three 1×16 splitters and four 12 fiber multi-fiber outputs. Another example is six 1×16 splitters with eight 12 fiber multi-fiber outputs. Another example can include 192 or 384 fiber count modules. With these higher count modules, the input side could also be a multi-fiber connection due to the increased number of input fibers especially for a 384 fiber module whether it would be 12 inputs for a 1×32 splitter configuration, or in a 192 fiber module assuming the use of 2×32 splitters, resulting in 12 inputs. The use of multi-fiber inputs for higher count configurations will further reduce their required pathway space required in the riser or other cable pathway structure as well as reduce the cable management required at the connection point. The compact splitter aggregation modules also permit more flexible, space saving, zone splitting options which will further reduce the required footprint for the infrastructure.

As shown in FIGS. 3-6, a splitter aggregation module 100 includes a housing 102 and input connector locations 104. A plurality of splitters 106 include at least one input 107. Each input 107 is connected to one of the input connector locations. Input 107 can be connected to an adapter by a connector, if desired. One example for module 100 is an SC or LC input 104.

One splitter 106a is shown as a 2×32 splitter with two inputs 107. One use for such a splitter can be for redundant inputs. Module 100 could be populated with three 1×32 splitters or three 2×32 splitters, or combinations thereof. As shown, module 100 includes two 1×32 splitters and one 2×32 splitter.

Figure 3:
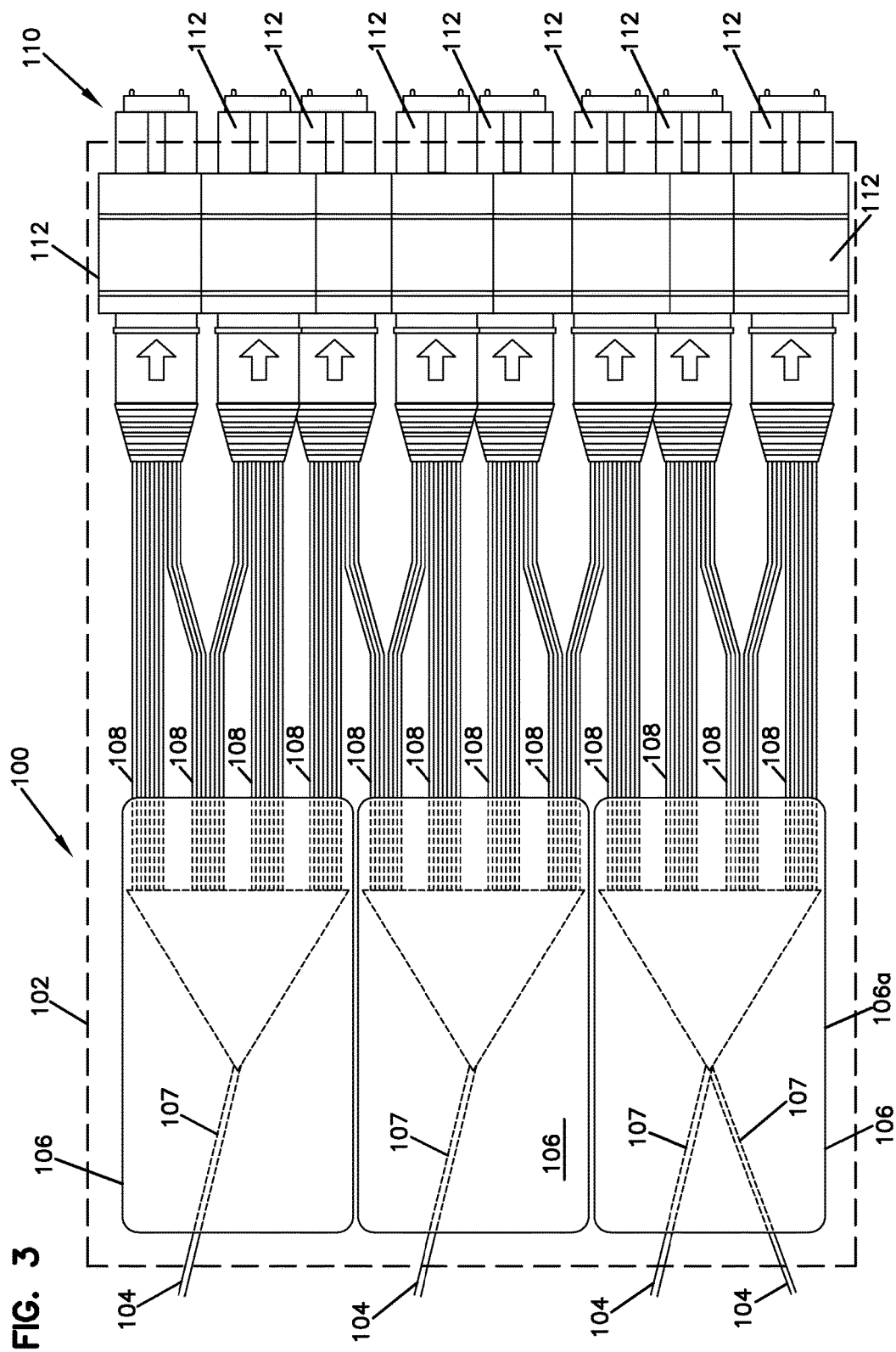
FIG. 3 shows one example fiber path map to aggregate splitters within a single module.
Figure 4:
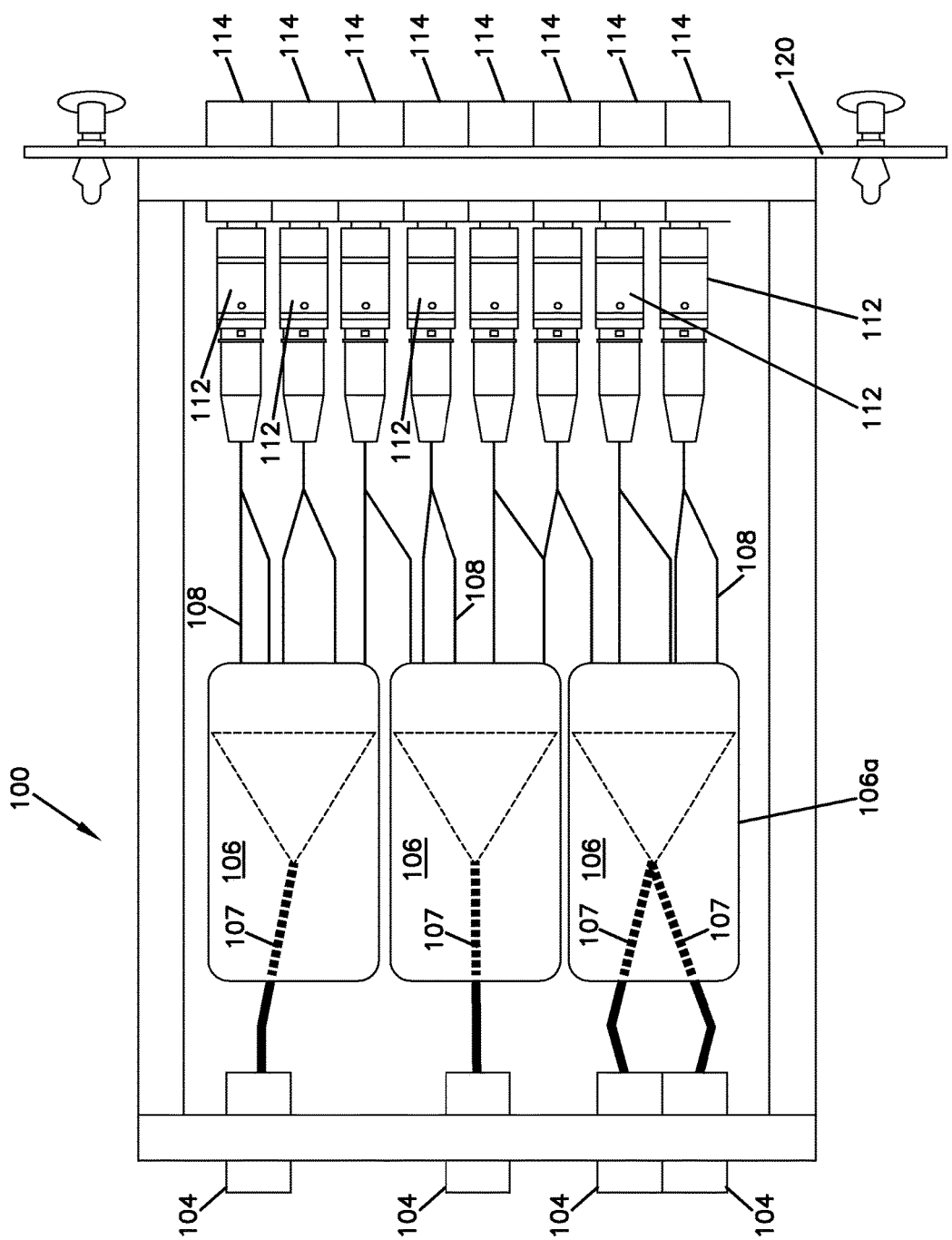
FIG. 4 is a further view of the module of FIG. 1 illustrating the fiber pathways in a different view.

The splitters 106 each have a plurality of outputs 108. Output connector locations 110 are in the form of a plurality of multi-fiber connectors (MPO) 112 connected to the splitter outputs 108. At least one of the multi-fiber connectors 112 has outputs from more than one of the plurality of splitters 106. As shown in FIGS. 3 and 4, two of the multi-fiber connectors 112 have splitter outputs 108 from more than one splitter. Multi-fiber connectors 112 mate with multi-fiber adapters 114. Outputs 108 can be in the form of ribbonized cables.

As noted in the FIGS., each of the splitters 106 have outputs which are multiples of eight. Specifically, the illustrated examples show splitters having 32 outputs each. Each of the multi-fiber connectors 112 include twelve fiber outputs from one or more of the splitters. With such an arrangement, each of the splitters has all of their outputs connected to one or more multi-fiber connectors. For example, the illustrated example shows a 96 output arrangement for module 100.

Figure 5:
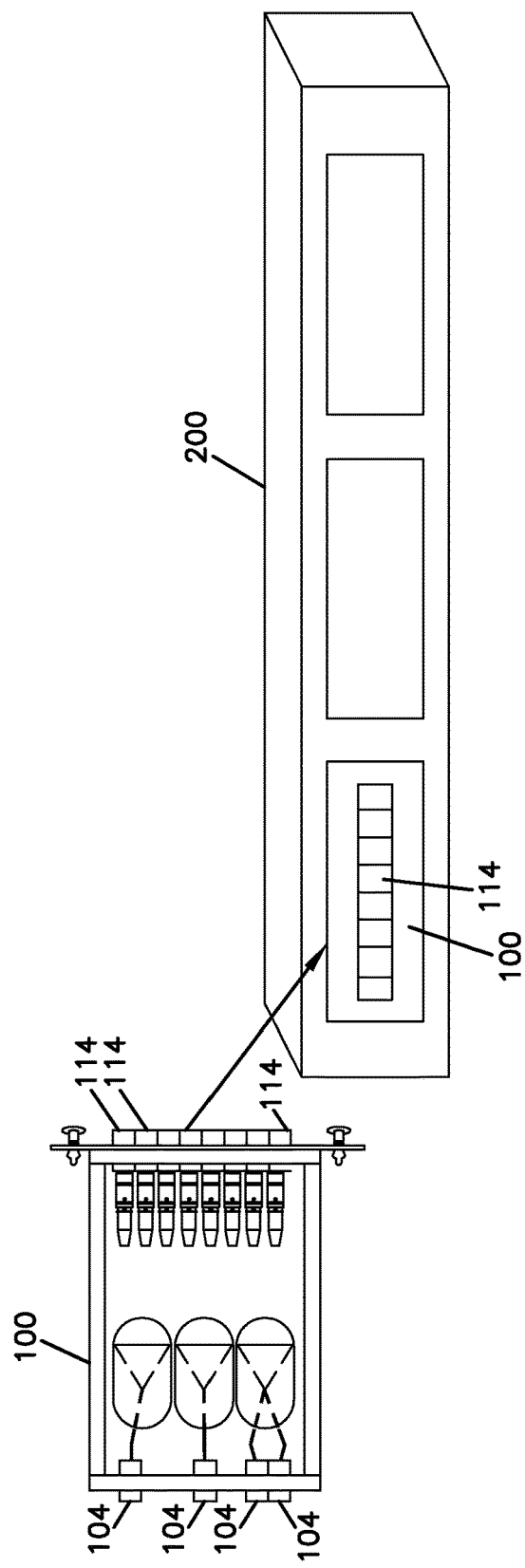
FIG. 5 shows a 96 fiber splitter aggregation module in accordance with the present invention.
Figure 6:
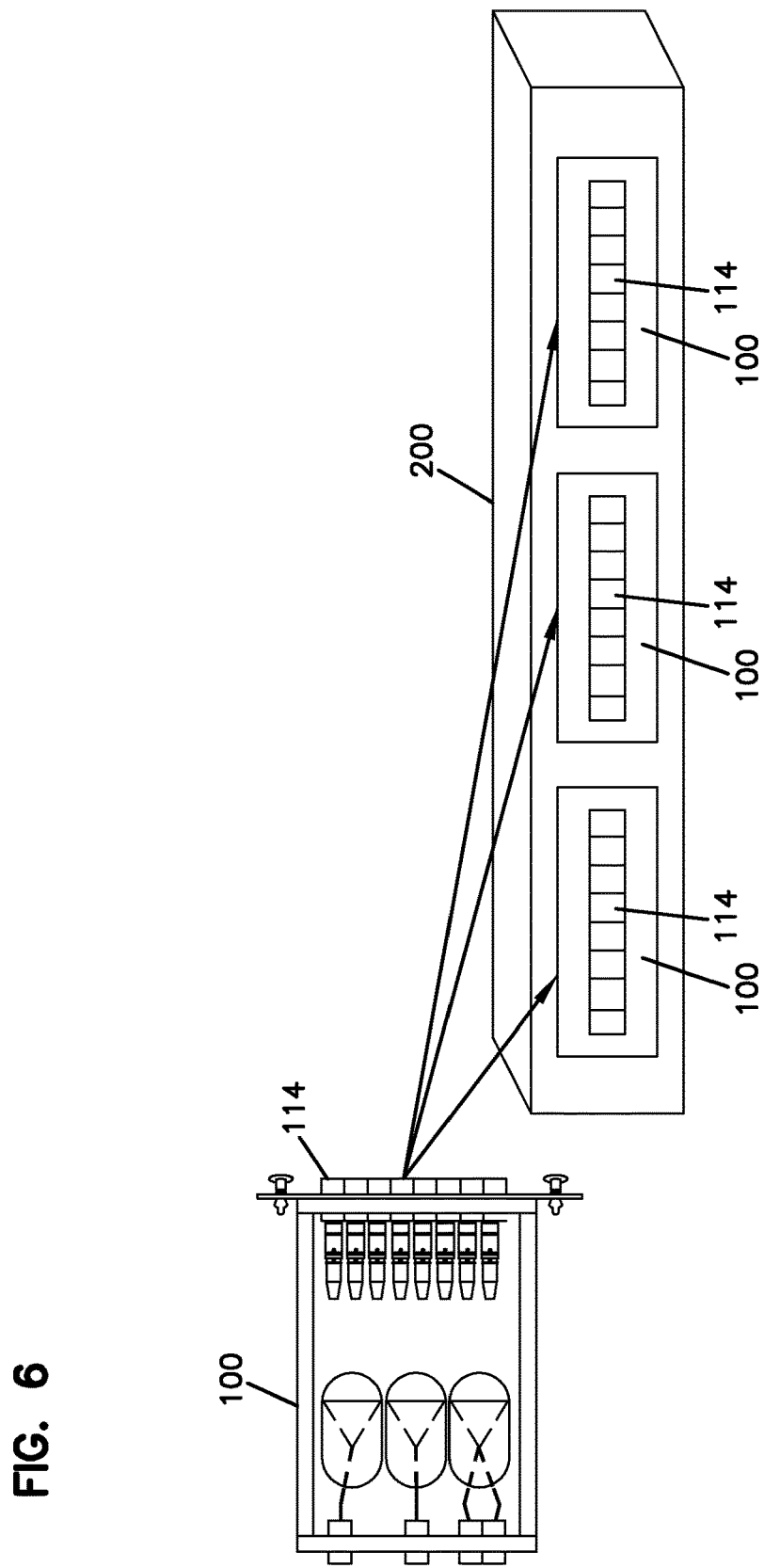
FIG. 6 shows a 288 fiber system, showing three splitter aggregation modules in accordance with the present invention.

As shown in FIGS. 5 and 6, each module 100 can reside in a chassis 200. FIG. 5 shows a single module 100 for 96 fibers. FIG. 6 shows chassis 200 receiving three modules 100 for 288 fibers.

With the aggregation module 100, 96 outputs for connecting to equipment can be replaced by 8 multi-fiber cables, thereby greatly reducing the mass of cables to be handled, stored and managed in various cable bundles as the cables are linked to downstream equipment. Trough sizes and slack storage areas can be reduced. Sometimes the cables are bundled in smaller and smaller bundles as the cable moves further away from the splitters to the equipment. Module 100 reduces the need for cable bundles or the number of cable bundles.

In the case of chassis 200 receiving three aggregation modules 100, 288 cables can be reduced to 24, thereby further reducing the space needs for the fibers and fiber bundles in the racks and troughing. As higher fiber counts are desired, even greater space savings is realized by modules 100.

It is to be appreciated that aggregation module 100 can have adapter inputs and outputs serving as the input connector locations and output connector locations, respectively. Also, the input connector locations and/or the output connector locations can be cables extending from module 100 for splicing or provided with connectorized pigtails or pigtails that can be connectorized as needed.

FIG. 3 shows the multi-fiber connectors 112 turned so that the various fibers can be more easily seen. FIG. 4 shows the connectors 112 turned 90 degrees across a front face 120 of module 100, and the fibers turned so that the different fibers of each ribbonized segment are viewed in a stack. FIG. 4 also shows connectors 112 mated to adapters 114. Adapters 114 receive a mating multi-fiber connector to connect equipment to the splitter outputs.

Figure 7:
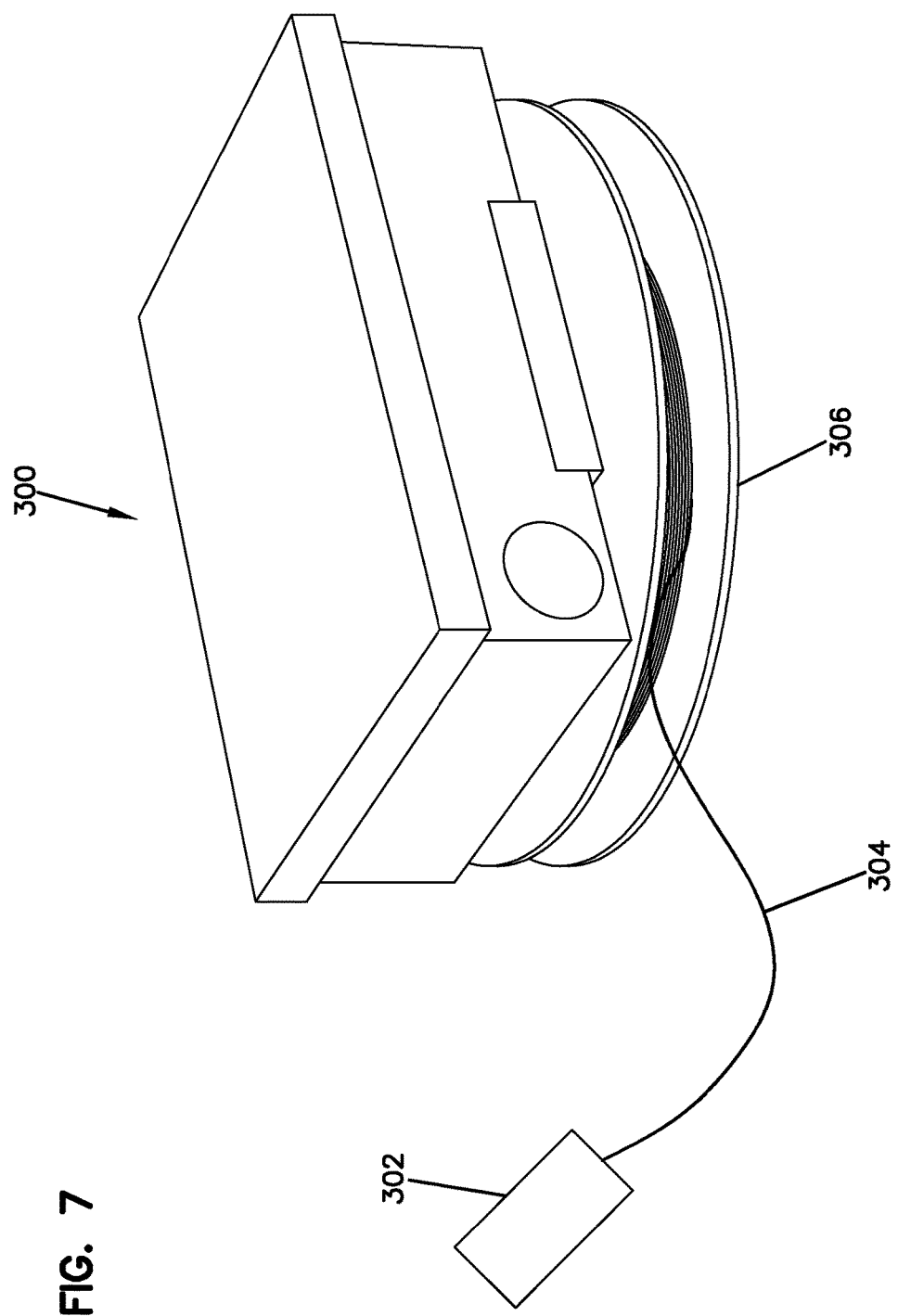
FIG. 7 shows fiber distribution terminal connectable to one of the splitter aggregation modules of FIGS. 3-6.

Each of the multi-fiber connectors 110 can connect to a fiber distribution terminal 300 as shown in FIG. 7 including a multi-fiber connector 302. Connector 302 is connected to a multi-fiber cable 304 which can be pulled from spool 306 as needed and connected to one of the multi-fiber adapters 114. The cable 304 is connected to internal equipment and/or terminations in terminal 300.

What is claimed is:

1. A module comprising:
    a plurality of input connector locations;
    a plurality of splitters with at least one input, each input connected to one of the input connector locations, the splitters each having a plurality of outputs;
    a plurality of output connector locations in the form of a plurality of multi-fiber connectors connected to the splitter outputs;
    wherein at least one of the multi-fiber connectors has outputs from more than one of the plurality of splitters,
    wherein the splitters have outputs with multiples of eight,
    wherein the multi-fiber connectors include twelve fiber outputs from one or more of the splitters,
    wherein the multi-fiber connectors are arranged in line with the splitters and are directly terminated to the outputs from the splitters, and
    wherein at least one of the multi-fiber connectors has outputs from only one of the plurality of splitters.

2. The module of claim 1, wherein the splitters are 1×32 splitters.

3. The module of claim 1, wherein the splitters are 2×32 splitters.

4. The module of claim 1, wherein two of the multi-fiber connectors have outputs from more than one of the plurality of splitters.

5. A module comprising:
    a plurality of input connector locations;
    a plurality of splitters with at least one input, each input connected to one of the input connector locations, the splitters each having a plurality of outputs;
    a plurality of output connector locations in the form of a plurality of multi-fiber connectors connected to the splitter outputs;
    wherein at least two of the multi-fiber connectors have outputs from more than one of the plurality of splitters,
    wherein the splitters have outputs with multiples of eight,
    wherein the multi-fiber connectors include twelve fiber outputs from one or more of the splitters,
    wherein the multi-fiber connectors are arranged in line with the splitters and are directly terminated to the outputs from the splitters, and
    wherein at least one of the multi-fiber connectors has outputs from only one of the plurality of splitters.

6. The module of claim 5, wherein the splitters are 1×32 splitters.

7. The module of claim 5, wherein the splitters are 2×32 splitters.

8. A splitter aggregation module comprising:
    a housing;
    a plurality of input connector locations in the form of adapters;
    a plurality of splitters, each splitter including at least one input, with each input connected to one of the input connector locations, the splitters each have a plurality of outputs;
    a plurality of output connector locations in the form of a plurality of multi-fiber adapters connected to the outputs of the splitters, wherein at least one of the multi-fiber connectors has outputs from more than one of the plurality of the splitters,
    wherein the splitters have outputs with multiples of eight,
    wherein the multi-fiber connectors include twelve fiber outputs from one or more of the splitters,
    wherein the multi-fiber connectors are arranged in line with the splitters and are directly terminated to the outputs from the splitters, and
    wherein at least one of the multi-fiber connectors has outputs from only one of the plurality of splitters.

9. The module of claim 8, wherein the splitters are 1×32 splitters.

10. The module of claim 8, wherein the splitters are 2×32 splitters.

11. The module of claim 8, wherein two of the multi-fiber connectors have outputs from more than one of the plurality of splitters.

12. The module of claim 8, where the input connector locations are in the form of single fiber adapters.

* * * * *